United States Patent Office 3,242,188
Patented Mar. 22, 1966

3,242,188
NEW 2-AZOLYL-5-OXADIAZOLYL-THIOPHENE COMPOUNDS
Adolf Emil Siegrist and Leonardo Guglielmetti, Basel, Erwin Maeder, Aesch, Basel-Land, and Peter Liechti, Binningen, Switzerland, assignors to Ciba Limited, Basel, Switzerland, a company of Switzerland
No Drawing. Filed Nov. 27, 1963, Ser. No. 326,355
Claims priority, application Switzerland, Nov. 30, 1962, 14,108/62
10 Claims. (Cl. 260—307)

The present invention provides new, valuable 2-azolyl-5-oxadiazolyl-thiophene compounds of the general formula (1) 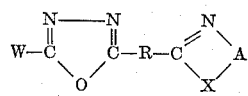

in which A represents a benzene radical two vicinal cyclic carbon atoms of which belong at the same time to the azole ring, X represents an oxygen atom or a —NH— group, R stands for a thiophene radical which is linked in position 2 with the azole ring and in position 5 with the 1:3:4-oxadiazole ring and W stands for a benzene radical.

A and W each represents a benzene radical which may contain further substituents, for example alkyl, alkenyl, or alkoxy groups, halogen atoms such as chlorine or fluorine, nitrile groups, cyanoalkyl, carboxyalkyl, carbalkoxyalkyl, phenyl, phenylalkyl, cycloalkyl groups or sulfonic acid groups.

Of the new 2-azolyl-5-oxadiazolyl-thiophene compounds of the composition defined above there may be mentioned especially, for example, those of the formula (2) 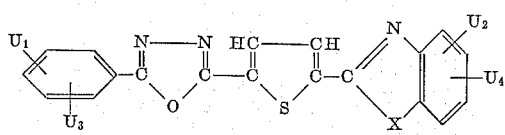

in which X stands for —O— or —NH—, $U_1$ and $U_2$ may be identical or different and each represents a hydrogen atom, or a halogen atom such as fluorine or especially chlorine, or an alkyl or alkoxy group with up to 12 carbon atoms, and $U_3$ and $U_4$ are identical or different and each represents a hydrogen atom or an alkyl or alkoxy group with 1 to 4 carbon atoms—and among these 2-azolyl-5-oxadiazolyl-thiophene compounds of the Formula 2, above all the 2-oxazolyl-5-oxadiazolyl-thiophene compounds of the formula (3) 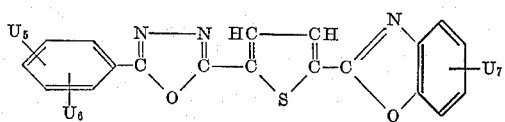

in which $U_5$ stands for a hydrogen or chlorine atom or an alkyl or alkoxy group with up to 8 carbon atoms, and $U_6$ and $U_7$ are identical or different and each represents a hydrogen atom or an alkyl group with 1 to 4 carbon atoms, for example a methyl, isopropyl or tertiary butyl radical.

The new 2-azolyl-5-oxadiazolyl-thiophene compounds of the general Formula 1 can be manufactured, for example, by reacting an oxadiazolyl-thiophene compound of the formula (4) 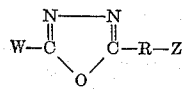

in which W represents a benzene radical and R a thiophene radical linked in position 2 with Z and in position 5 with the 1:3:4-oxadiazole ring, and Z a possibly functionally converted carboxyl group, more especially a carboxyl group, a lower carboxylic acid alkyl ester group such as a carboxylic acid methyl ester group or a carboxylic acid halide group such as a carboxylic acid chloride group—with an ortho-amino compound of the formula (5) 

in which A represents a benzene radical to which —$NH_2$ and $X_1$ are linked in vicinal positions, and $X_1$ stands for a hydroxyl group —OH or an amino group —$NH_2$. The procedure may be as follows:

An oxadiazolyl-thiophene compound of the Formula 4—where Z is a carboxyl group or a lower carboxylic acid alkyl ester group, more especially a carboxylic acid methyl ester group—is reacted at an elevated temperature within the range of about 120 to 250° C., in the presence of polyphosphoric acids including pyrophosphoric acid, is reacted with the ortho-amino compound of the Formula 5; or the starting material used may be an oxadiazolyl-thiophene compound of the Formula 4—where Z stands for a free carboxyl group or a lower carboxylic acid alkyl ester group, more especially a carboxylic acid methyl ester group—the selected oxadiazolyl-thiophene-monocarboxylic acid or carboxylic acid ester being reacted at a temperature ranging from about 150 to 300° C., in the presence of a catalyst, more especially boric acid, with the ortho-amino compound of the Formula 5 to form a 2-azolyl-thiophene compound of the composition defined above. When the catalyst used in this process is boric acid, it is of advantage to use about 0.5 to 5% of this acid, referred to the total weight of the reaction mixture. The reaction is advantageously performed in the simultaneous presence of a high-boiling polar organic solvent, such as an aliphatic, possible etherified, hydroxy compound, such as propyleneglycol, ethyleneglycol monoethyl ether or especially diethylene-glycol diethyl ether (diethylcarbitol). 2-azolyl-5-oxadiazolyl-thiophene compounds can also be prepared by simply melting together the ortho-amino compound with an oxadiazolyl-thiophene of the Formula 4—in which Z represents a free carboxyl group—in the presence of boric acid.

According to another variant of the process for the manufacture of 2-azolyl-5-oxadiazolyl-thiophene compound of the Formula 1 the reaction is performed in two stages: In the first stage the oxadiazolyl-thiophene compound of the Formula 4—where Z stands for a carboxylic acid halide group, more especially a carboxylic acid chloride group—is condensed at a temperature ranging from about 100 to 200° C., in the presence of an inert organic solvent such as toluene, a xylene, ortho-dichlorobenzene or especially chlorobenzene, with the ortho-amino compound of the Formula 5 to form the acyl compound of the formula

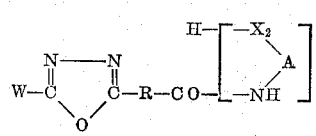

in which A, R and W have the above meanings and $X_2$ stands for an oxygen atom or a —NH— group—whereupon this acyl compound (if desired after first having been isolated) is converted by heating to a temperature within the range of about 150 to 300° C., in the presence of a catalyst such as zinc chloride or primarily boric acid, into the 2-azolyl-5-oxadiazolyl-thiophene compound.

The oxadiazolyl-thiophene compounds of the Formula 4 to be used as starting materials can be manufactured, for example, by reacting a thiophene-monocarboxylic acid halide, especially a thiophene-monocarboxylic acid chloride, of the formula (7)
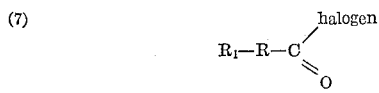

in which $R_1$ stands for a lower carboxylic acid alkyl ester group, especially a carboxylic acid methyl ester group, and R for a thiophene radical linked in position 2 with the carboxylic acid halide group and in position 5 with $R_1$—in the presence of an organic solvent, with a monoacylhydrazine, whereupon the diacylhydrazine formed (if desired after first having been isolated) is treated with a water-eliminating agent and optionally in the oxadiazolyl-thiophene compound, the lower carboxylic acid alkyl ester group, especially the carboxylic acid methyl ester group, linked with the thiophene radical, is hydrolysed to the carboxyl group or converted into another carboxylic acid ester group or another functionally modified carboxyl group, especially a carboxylic acid halide group. The procedure adopted may, for example, be as follows: In the first stage the thiophene-monocarboxylic acid halide, especially a thiophene-monocarboxylic acid chloride, of the Formula 7 is reacted with a monoacylhydrazine in the presence of an inert organic solvent such as toluene, a xylene, ortho-dichlorobenzene or especially chlorobenzene, at a temperature ranging from about 100 to 200° C., whereupon the diacylhydrazine so formed is treated without intermediate isolation with a water-eliminating agent, more especially one that does not sulfonate; alternatively, the thiophene-monocarboxylic acid halide, especially a thiophene-monocarboxylic acid chloride, of the Formula 7 is first reacted with a monoacylhydrazine in the presence of a pyridine base such as picoline or preferably pyridine, which acts simultaneously as a solvent and as an acid-acceptor, whereupon the diacylhydrazine formed is isolated and then treated with a water-eliminating agent, preferably one that does not sulfonate.

Preferred water-eliminating agents are those which do not sulfonate, such as zinc chloride, aluminium chloride, phosphorus trichloride, pentachloride or oxychloride, and in the first place thionyl chloride. The cyclisation may be performed, for example, by heating the diacylhydrazine with the water-eliminating agent in an inert organic solvent. When thionyl chloride is used as water-eliminating agent, there may be used instead of the inert organic solvent an excess of thionyl chloride, distilling off the surplus thionyl chloride after the reaction, if desired under reduced pressure.

The thiophene-monocarboxylic acid halides of the Formula 7 to be used in the manufacture of the starting materials of the Formula 4 are known or, if new, they can be manufactured by known methods, for example by treating the monoethyl or especially the monomethyl ester of, for example, thiophene-2:5-dicarboxylic acid, 3:4-dimethyl-thiophene-2:5-dicarboxylic acid or 3:4-diphenyl-thiophene-2:5-dicarboxylic acid, with thionyl chloride. A particularly useful thiophene-monocarboxylic acid halide of the Formula 7 is, of example, the known acid chloride of the formula (8)
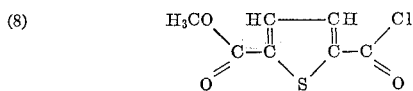

The monoacylhydrazines to be used in the manufacture of the starting materials of the Formula 4 are likewise either known or, if new, they can be prepared by known methods, for example by monoacylating hydrazine with a functional derivative of a carboxylic acid, such as an anhydride, acid chloride or especially an ester thereof.

Particularly suitable monoacylhydrazines are, for example, those of the formula (9)
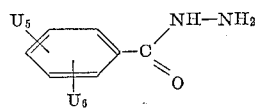

in which $U_5$ represents a hydrogen atom, a halogen atom, especially chlorine, or an alkyl or alkoxy group with up to 8 carbon atoms, and $U_6$ stands for a hydrogen atom or an alkyl group with 1 to 4 carbon atoms—for example the monoacylhydrazines of the formula

(10)
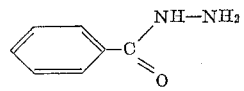

(11)
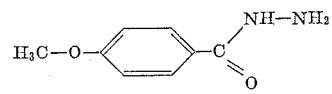

(12)
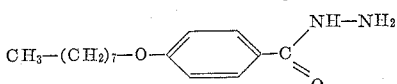

(13)
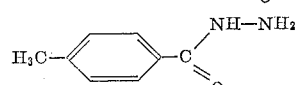

(14)
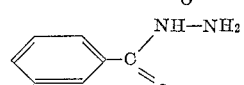

(15)
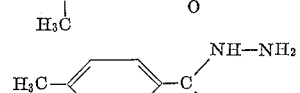

(16)
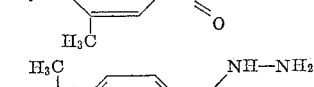

The oxadiazolyl-thiophene compounds of the Formula 4 to be used as starting materials can alternatively be prepared by reacting a thiophene-monocarboxylic acid hydrazide of the formula

(17)
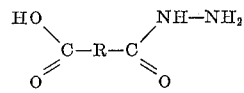

in which R represents a thiophene radical which is bound in position 2 with the carboxylic acid hydrazide group and in position 5 with the carboxyl group—in the presence of an organic solvent with a monocarboxylic acid halide, more especially with a monocarboxylic acid chloride, and treating the resulting diacylhydrazine with a water-eliminating agent, if desired after first having isolated it. When thionyl chloride is used as water-eliminating agent, the reaction may be performed so that together with the cyclisation reaction the carboxyl group linked in 5-position with the thiophene radical is converted into a carboxylic acid chloride group which latter can then be hydrolysed to a carboxyl group, or it may be converted into another functionally modified carboxyl group, especially into a lower carboxylic acid alkyl ester group.

According to another process for the manufacture of the oxadiazolyl-thiophene compounds of the Formula 4 to be used as starting materials, a chloromethyl group is introduced into the 2-position of the thiophene ring of a thiophene compound of the general formula

(18)
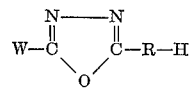

in which W represents a benzene radical and R a thiophene radical bound in position 2 with H and in position 5 with the 1:3:4-oxadiazole ring—by reacting with hydrogen chloride and formaldehyde or paraformaldehyde, or with dichloromethyl ether, whereupon in the chloromethylated compound of the formula

(19) 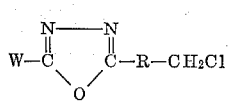

the chloromethyl group is hydrolysed to the hydroxymethyl group, the latter is oxidised to the carboxyl group which, if desired, is esterified or converted into another functionally modified carboxyl group, more especially a carboxylic acid halide group.

As ortho-amino compounds of the Formula 5, to be reacted with oxadiazolyl-thiophene compounds of the Formula 4 to give rise to new 2-azolyl-5-oxadiazolyl-thiophene compounds of the Formula 1, there are used in the case of the 2-imidazolyl-5-oxadiazolyl-thiophene compounds ortho-diamines of the benzene radical, for example 1:2 - diaminobenzene, 1 - methyl - 3:4 - diaminobenzene, 3:4 - diamino - 1:2 - dimethylbenzene, 1 - methoxy - 3:4 - diaminobenzene, isopropyl-ortho-phenylenediamine or 1-chloro-3:4-diaminobenzene. In the case of the 2-oxazolyl-5-oxadiazolyl-thiophene compounds there are suitable as further starting materials, for example 1-hydroxy -2-amino-4- or -5-methylbenzene, furthermore 1 - amino - 2 - hydroxy - 5 - methoxybenzene, 1 - amino-2-hydroxy-5-tertiary butylbenzene, 1-amino-2-hydroxy-5-octylbenzene of the formula

(20) 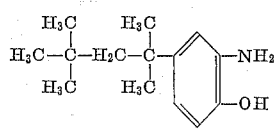

1 - amino - 2 - hydroxy - 5 - dodecylbenzene, 1 - amino-2-hydroxy-5-fluorobenzene and 1-amino-2-hydroxy-4:5-dimethylbenzene.

According to another process for the manufacture of the new 2-azolyl-5-oxadiazolyl-thiophene compounds of the Formula 1, an azolyl-thiophene-monocarboxylic acid halide, especially an acid chloride, of the formula

(21) 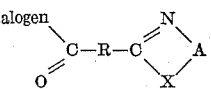

in which A represents a benzene radical of which two vicinal cyclic carbon atoms belong at the same time to the azole ring, X stands for an oxygen atom or an —NH— group and R represents a thiophene ring bound in position 2 with the azole ring and in position 5 with the carboxylic acid halide group—is reacted in the presence of an organic solvent with a monoacylhydrazine and the diacylhydrazine so formed (if desired after first having been isolated) is treated with a water-eliminating agent, preferably one that does not sulfonate such as thionyl chloride; another process consists essentially in reacting an azolyl-thiophene-monocarboxylic acid hydrazide of the formula

(22) 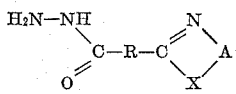

in which A, R and X have the same meanings as in Formula 21—in the presence of an organic solvent with a monocarboxylic acid halide, especially a monocarboxylic acid chloride, and the diacylhydrazine thus formed (if desired after having been isolated) is treated with a water-eliminating agent, especially one that does not sulfonate, such as thionyl chloride.

The azolyl-thiophene-monocarboxylic acid halides, especially acid chlorides, of the Formula 21, or azolyl-thiophene-monocarboxylic acid hydrazides of the Formula 22, to be used as relevant starting materials can be prepared, for example, by first condensing a thiophene-monocarboxylic acid halide, especially a carboxylic acid chloride, of the formula (7) 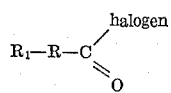

in which $R_1$ represents a lower carboxylic acid alkyl ester group, especially a carboxylic acid methyl ester group, and R a thiophene radical which is linked in position 2 with the carboxylic acid halide group and in position 5 with $R_1$—at an elevated temperature ranging from about 100 to 200° C., in the presence of an inert organic solvent such as toluene, xylene or ortho-dichlorobenzene or especially chlorobenzene, with an ortho-amino compound of the formula (5) 

in which A and $X_1$ have the above meanings—to form an acyl compound of the formula

(23) 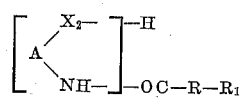

where A, R and $R_1$ have the above meanings and $X_2$ stands for an oxygen atom or an —NH—group—whereupon this acyl compound (if desired after first having isolated) is converted into the monoazolyl-thiophene compound by heating at a temperature ranging from about 150 to 300° C., in the presence of a water-eliminating agent, such as zinc chloride or preferably boric acid, and in the resulting monoazolyl-thiophene compound the lower carboxylic acid alkyl ester group, especially carboxylic acid methyl ester group, $R_1$ bound in the thiophene radical is converted into a carboxylic acid halide group, especially a carboxylic acid chloride group or into a carboxylic acid hydrazide group. When in the second stage of this process boric acid is used as water-eliminating agent, it is of advantage to use it in an amount of about 0.5 to 5%, referred to the total weight of the reaction mixture, and preferably in the presence of a high-boiling polar organic solvent such as an alphatic, if desired etherified, oxy compound, for example propyleneglycol, ethyleneglycol monoethyl ether or especially diethyleneglycol diethyl ether.

The conversion of the lower carboxylic acid alkyl ester group, more especially a carboxylic acid methyl ester group [compare $R_1$ in the Formulae 7 and 23] into a carboxylic acid halide group, more especially a carboxylic acid chloride group or into a carboxylic acid hydrazide group, is carried out in the known manner. Thus, for example, the carboxylic acid methyl ester group may be hydrolysed to form the carboxyl group and the free carboxyl group converted into the carboxylic acid chloride group, for example with the aid of thionyl chloride. The carboxylic acid hydrizide group can be prepared, for example, by reacting hydrazine upon the carboxylic acid methyl ester group, if desired in the presence of a solvent such as methanol, ethanol or dioxane.

As mentioned above, the thiophene-monocarboxylic acid halides of the Formula 7 are known or, if new, they can be prepared by known methods.

The azolyl-thiophene-monocarboxylic acid halides suitable as starting materials in the manufacture of the new 2-azolyl-5-oxadiazolyl-thiophene compounds of the Formula 1, more especially acid chlorides of the formula

(21) 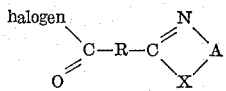

and azolyl-thiophene-monocarboxylic acid hydrazides of the formula

(22) 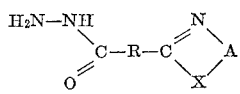

in which A, R and X have the above meanings—can also be manufactured by introducing a chloromethyl group in position 5 of the thiophene ring of a thiophene compound of the general formula

(24) 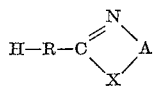

in which A represents a benzene radical of which two vicinal cyclic carbon atoms at the same time belong to the azole ring, X stands for an oxygen atom or an —NH—group and R for a thiophene radical bound in position 2 whith the azole ring and in position 5 with H—by reaction with hydrogen chloride and formaldehyde or paraformaldehyde or with dichloromethyl ether, whereupon in the chloromethylated compound of the formula

(25) 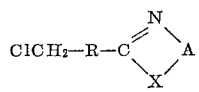

the chloromethyl group is hydrolysed, the hydroxymethyl group is oxidised to the carboxyl group and the latter is converted into a carboxylic acid halide group, more especially a carboxylic acid chloride group, which latter can be converted with hydrazine into the carboxylic acid hydrazide group.

From among the starting materials for use in the manufacture of the new 2-azolyl-5-oxadiazolyl-thiophene compounds of the Formula 1 there may be especially mentioned for example, the azolyl-thiophene monocarboxylic acid halides, more especially acid chlorides of the formula

(26) 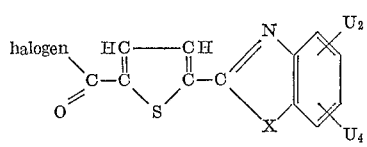

and the azolyl-thiophene-monocarboxylic acid hydrazides of formula

(27) 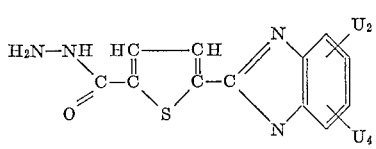

and the oxadiazolyl-thiophene compounds of the formula

(28) 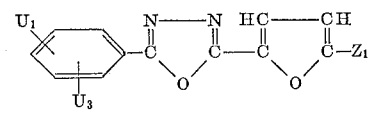

in which $U_1$ to $U_4$ and X have the same meanings as in Formula 2 and $Z_1$ represents a lower carboxylic acid alkyl ester group, more especially a carboxylic acid methyl ester, carboxylic acid halide, more especially carboxylic acid chloride, or a carboxyl group.

The new 2-azolyl-5-oxadiazolyl-thiophene compounds of the general Formula 1, obtained by the present process, can be used, for example, for various photographic purposes, such as electrophotographic reproduction, or for supersensitising photographic materials and also as scintillators.

The new 2-azolyl-5-oxadiazolyl-thiophene compounds of the general Formula 1, obtained by the present process, are above all valuable optical brighteners. They may be used for optically brightening a wide variety of organic materials.

The application of the new brighteners may consist in impregnating the material to be brightened at an elevated temperature, ranging for example from 50 to 100° C., with a solution, preferably an aqueous solution, or a dispersion of the compound, whereupon the impregnated material is centrifuged or squeezed and then dried. Apart from the said aqueous solutions there may also be used for the improvement according to the invention solutions in organic solvents. It is also possible to treat the material with the new compounds in a dispersed form, for example with dispersions prepared with dispersing agents such as soaps, soap-like substances, polyglycol ethers of fatty alcohols, sulphite cellulose waste liquor or with formaldehyde condensation products of possibly alkylated naphthalenesulfonic acids.

Furthermore, the new 2-azolyl-5-oxadiazolyl-thiophene compounds can also be added to or incorporated with the organic material before or during its shaping. Inter alia, they may be added to the moulding compositions from which films, foils, tapes or mouldings are made or they may be dissolved or finely dispersed in the spinning mass before the latter is spun. The new 2-azolyl-5-oxadiazolyl-thiophene compounds of the composition above may also be added to the reaction mixtures before or during the polycondensation leading, for example, to polyesters or polyamides, or before or during the polymerisation of monomers, for example acrylonitrile or vinyl chloride.

The requisite amount of the new 2-azolyl-5-oxadiazolyl-thiophene compound, referred to the weight of the material to be optically brightened, may vary within wide limits. Even a very small amount, in some cases, for example, as little as 0.01%, may produce a distinct and durable brightening effect. While an amount of more than 2% may in general not prove harmful, it does not offer any advantage over the normal amount either.

The new 2-azolyl-5-oxadiazolyl-thiophene compounds may be used as optical brighteners in the following ways:

(a) In admixture with dyestuffs or as additives to dyebaths, printing, discharge or reserve printing pastes. Also for after-treating dyeings, prints or discharge prints.

(b) In admixture with chemical bleaches or as additives to bleaching baths.

(c) In admixture with dressing agents, such as starch or synthetic dressing agents. The compound of the invention may be added, for example, to a conventional liquor used for producing an anti-crease effect.

(d) In conjunction with detergents. The detergent and the brightener may be added separately to the washing liquor. It is also of advantage to use a detergent of which one ingredient is the brightener. Suitable detergents are, for example, soaps, salts of sulfonate detergents, for example of sulfonated benzimidazoles substituted on the carbon atom 2 by higher alkyl radicals; furthermore salts of monocarboxylic acid esters of 4-sulfophthalic acid with higher fatty alcohols; also salts of fatty alcohol sulfonates, alkyl-arylsulfonic acids or condensation products of higher fatty acid with aliphatic hydroxysulfonic acids. Furthermore, there may be used non-ionic detergents, for example polyglycol ethers derived from ethylene oxide and higher fatty alcohols, alkylphenols or fatty amines.

The detergents of the kind referred to above may also contain the usual additives to detergents such as alkali metal carbonates, phosphates, pyrophosphates, polyphosphates, metaphosphates, silicates, perborates or percarbonates, provided the brightening agent is compatible with such additives. It is also possible to manufacture detergents consisting exclusively or predominantly of inorganic compounds having a detergent action and the brightening agent. The mixtures containing the detergent and the optical brightener are obtained by simply mixing and/or grinding the ingredients together; in this connection it may be advantageous to use one or the other ingredient in the dissolved or molten state to facilitate dispersion.

In general a small addition of the optical brightener to the detergent will suffice; there may be used, for example, an amount of 0.1 to 2% referred to the weight of detergent used; also smaller amounts, for example 0.01%, may be added. It is also possible to use mixtures with other known brightening agents.

The detergents are used in the usual washing methods; in this way the materials to be cleaned may be washed and at the same time brightened.

Materials to be optically brightened may be, for example:

A. Textile materials which may be in any desired form, for example in the form of fibres, filaments, yarns, woven or knitted fabrics or felt, as well as any product manufactured therefrom; such textile materials may consist of: natural materials of animal origin, such as wool or silk, or of vegetable origin, such as cellulose materials of cotton, hemp, flax, linen, jute, ramie; or of semi-synthetic materials such as regenerated cellulose, for example rayon, viscoses, including spun rayon; furthermore of cellulose esters such as cellulose butyrate and acetylcellulose, also of synthetic materials accessible by polymerisation, for example polyacrylonitrile, polyvinyl chloride, polyvinylidene chloride, polyolefines such as polyethylene and especially polypropylene, or of synthetic materials that are accessible by polycondensation, more especially polyesters and polyamides.

B. Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibrous materials, more especially paper, cardboard or hardboard, as well as finished products made from the latter.

C. Synthetic materials of diverse constitution in the form of powders, films, lacquers, resins or mouldings, consisting for example of acetylcellulose, nitrocellulose, vinyl acetate, polystyrene, polyvinyl chloride, copolymers of vinyl chloride and vinylidene chloride, alkyd resin lacquers, polyolefines, polyacrylonitrile, polyamides, polyesters, epoxy resins, formaldehyde condensation products with phenol, urea or melamine.

When the new brighteners are used in conjunction with other improving agents, for example by one of the methods described above under (a) to (d), it is of advantage to perform such a combined treatment with the aid of a suitable preparation. These stable preparations contain at least one 2-azolyl-5-oxadiazolyl-thiophene compound of the constitution defined above and at least one dispersing agent, detergent, dyestuff, pigment, dressing agent or finely dispersed carrier.

Unless otherwise indicated, parts and percentages in the following examples are by weight.

EXAMPLE 1

25.9 parts of 5-[benzoxazolyl-(2′)]-thiophene-2-carboxylic acid hydrazide are stirred at room temperature in 300 parts by volume of pyridine. 15.4 parts of benzoyl chloride are then dropped in at 20 to 25° C. within 45 minutes, and the whole is stirred on for 45 minutes at this temperature. In the course of one hour the reaction mixture is then heated up to 85 to 90° C., and the yellow, slightly turbid solution is stirred on for 3 hours at this temperature, then cooled to room temperature and stirred into 3000 parts of cold water. The precipitated reaction product is suctioned off, washed with cold and then with hot water and dried. Yield: about 34.0 parts (=93.7% of the theoretical) of diacylhydrazine of the formula

(29) 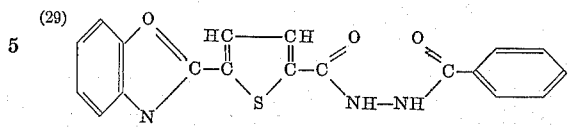

in the form of a pale-yellow powder.

36.3 parts of the diacylhydrazine of the Formula 29 in 300 parts by volume of freshly distilled thionyl chloride are heated to the boil within one hour while being stirred, and then refluxed for 3 to 6 hours, during which a substantially clear, yellow solution forms. The excess thionyl chloride is distilled off under atmospheric pressure and then under reduced pressure. The residue is triturated with ice-water, filtered, washed with water until the washings run neutral, and dried, to yield about 34.2 parts (=99% of the theoretical yield) of 5-[benzoxazolyl-(2′)] - 2-[5′-phenyl-(1″)-1′:3′:4′-oxadiazolyl-(2′)]-thiophene of the formula

(30) 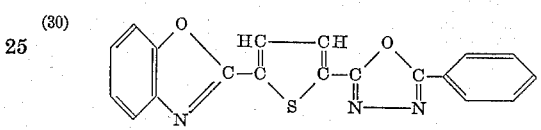

in the form of a yellow powder which melts at 223.5 to 225.5° C. Three recrystallizations from chlorobenzene+perchloroethylene (1:1) with the aid of active carbon and bleaching earth yield pale-yellow, very fine needles melting at 235 to 235.5° C. which display a very strong blue fluorescence in ultraviolet light.

Analysis.—$C_{19}H_{11}O_2N_3S$ (molecular weight 345.38): Calculated—C, 66.07; H, 3.21; N, 12.17%. Found—C, 65.87; H, 3.30; N, 11.92%.

The 5-[benzoxazolyl-(2′)]-thiophene-2-carboxylic acid hydrazide used as starting material can be prepared thus:

A mixture of 37.2 parts of thiophene-2:5-dicarboxylic acid monomethyl ester (prepared as described in Example VIIa of U.S. Patent No. 2,680,731 to E. I. du Pont de Nemours and Company, patented June 8, 1954), 250 parts by volume of chlorobenzene and 30 parts of thionyl chloride is heated within one hour to 115° C. while being stirred and then for another hour at this temperature, whereupon all passes into solution and thiophene-2:5-dicarboxylic acid monomethyl ester chloride is formed. The excess thionyl chloride is expelled by passing a current of dry air through the reaction mixture or by distillation under reduced pressure, and at 20° C. 21.8 parts of 1-amino-2-hydroxybenzene are added. While thoroughly stirring the reaction mixture, it is heated within 1 to 1½ hours to the boil, and the batch is refluxed for 3 to 4 hours, whereupon the amide of the formula

(31) 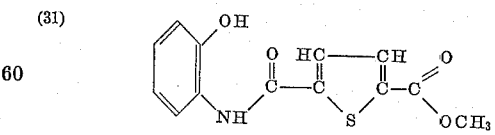

settles partially out. When hydrochloric acid is no longer being evolved, 50 parts by volume of diethyleneglycol diethyl ether and 2 parts of boric acid are added, and the reaction mixture is heated within 2 to 3 hours to 220° C. while being stirred and with exclusion of air, the solvents being removed almost completely, and the water formed during the reaction being removed, through a descending condenser. The reaction mixture is heated for another hour at 220 to 235° C., and during the subsequent cooling 100 parts by volume of dioxane and then 250 parts by volume of methanol are added. The batch is then cooled to room temperature, and the crystalline precipitate of 5-[benzoxazolyl-(2')]-thiophene-2-carboxylic acid methyl ester of the formula (32)

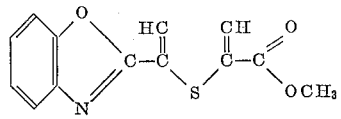

is suctioned off, washed with methanol and dried, to yield about 41.6 parts (=80.4% of the theoretical yield) of a light-beige colored crystalline powder melting at 131 to 133.5° C. When the filtrate is concentrated to 100 parts by volume and 50 parts of water are added, there are further obtained 4.8 parts (=9.2% of the theoretical yield) of a product of slightly more intense color which melts at 134.5° C. On four recrystallizations from dioxane+water (4:1) with the aid of active carbon, fine, colorless crystals are obtained which melt at 145 to 145.5° C. and display blue fluorescence in ultraviolet light.

*Analysis.*—$C_{13}H_9O_3NS$ (molecular weight 259.28): Calculated—C, 60.22; H, 3.50; N, 5.40%. Found—C, 60.36; H, 3.55; N, 5.43%.

51.8 parts of 5-[benzoxazolyl-(2')]-thiophene-2-carboxylic acid methyl ester are dissolved with heating in 400 parts by volume of dioxane. 50 parts of hydrazine hydrate are then added to this solution and the batch is stirred for 15 hours under reflux, whereupon 5-[benzoxazolyl-(2')] - thiophene-2-carboxylic acid hydrazide of the formula (33)

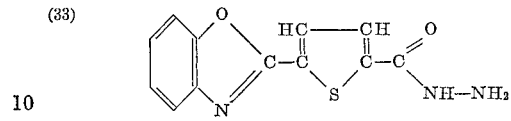

gradually settles out in the form of fine needles. The reaction mixture is diluted with 200 parts by volume of methanol, cooled to about 5° C., suction-filtered and the filter residue is washed with 250 parts by volume of methanol cooled to 5° C. After drying, there are obtained about 45.8 parts (=88.5% of the theoretical yield) of pale-yellow, fine needles melting at 250.5 to 251° C.

*Analysis.*—$C_{12}H_9O_2N_3S$ (molecular weight 259.29): Calculated—C, 55.59; H, 3.50; N, 16.21%. Found—C, 55.58; H, 3.60; N, 16.33%.

The benzoxazolyl-oxadiazolyl-thiophene compounds described in the following Table I can be manufactured in a similar manner:

*Table 1*

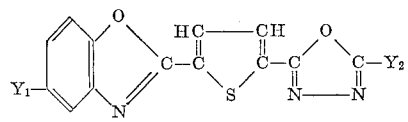

| No. | Compound | | Yield (crude) in percent | Properties | Analysis | |
| | $Y_1$ | $Y_2$ | | | Calculated (molec. wt.) | Found |
| --- | --- | --- | --- | --- | --- | --- |
| 34 | —H | —⟨phenyl⟩—C(CH₃)₃ | 97.4 | Light-yellow, shiny crystals, M.P. 227-228° C. (tetrachloroethylene). | C, 68.81; H, 4.77; N, 10.47. (401.50) | C, 68.53; H, 4.75; N, 10.29. |
| 35 | —H | —⟨phenyl⟩ with CH₃, CH₃ | 97.8 | Light-yellow, shiny, fine needles, M.P. 204-204.5° C. (dimethylformamide). | C, 67.45; H, 4.05; N, 11.25. (373.43) | C, 67.63; H, 3.93; N, 11.13. |
| 36 | —H | —⟨phenyl⟩—Cl | 95.8 | Pale-yellow, shiny, fine crystals, M.P. 234-234.5° C. (dimethylformamide). | C, 60.08; H, 2.65; N, 11.06. (379.83) | C, 60.25; H, 2.62; N, 10.97. |
| 37 | —H | —⟨phenyl⟩ with OCH₃, Cl | 99.5 | Pale-yellow, very fine felted needles, M.P. 255-255.5° C. (dimethylformamide). | C, 58.61; H, 2.95; N, 10.25. (409.85) | C, 58.59; H, 2.85; N, 10.31. |
| 38 | —H | —⟨phenyl⟩—OCH₃ | 92.8 | Light-yellow, very fine crystals, M.P. 231-231.5° C. (dimethylformamide). | C, 63.99; H, 3.49; N, 11.19. (375.41) | C, 63.76; H, 3.72; N, 11.10. |
| 39 | —H | —⟨phenyl⟩—O-(CH₂)₇-CH₃ | 97.8 | Pale-yellow shiny, fine crystals, M.P. 188.5-190° C. (dimethylformamide). | C, 68.48; H, 5.75; N, 8.87. (473.60) | C, 68.43; H, 5.83; N, 9.01. |
| 40 | —CH₃ | —⟨phenyl⟩ | 98.5 | Pale-yellow, fine crystal powder, M.P. 252-252.5° C. (dimethylformamide). | C, 66.84; H, 3.65; N, 11.69. (359.41) | C, 66.23; H, 3.68; N, 11.52. |
| 41 | —CH₃ | —⟨phenyl⟩—C(CH₃)₃ | 94.7 | Light-yellow, fine crystal powder, M.P. 212° C. (dioxane). | C, 69.37; H, 5.09; N, 10.11. (415.52) | C, 69.13; H, 5.08; N, 9.82. |
| 42 | —CH₃ | —⟨phenyl⟩ with CH₃, CH₃ | 99 | Light-yellow, fine crystal powder, M.P. 210-210.5° C. (dimethylformamide). | C, 68.18; H, 4.42; N, 10.85. (387.47) | C, 68.23; H, 4.33; N, 10.61. |
| 43 | —CH₃ | —⟨phenyl⟩—OCH₃ | 96.5 | Light-yellow, fine crystal powder, M.P. 233° C. (dimethylformamide). | C, 64.77; H, 3.88; N, 10.79. (389.43) | C, 64.92; H, 3.91; N, 10.64. |

Table I—Continued

| No. | Compound Y₁ | Compound Y₂ | Yield (crude) in percent | Properties | Analysis Calculated (molec. wt.) | Analysis Found |
|---|---|---|---|---|---|---|
| 44 | —CH₃ | —⟨phenyl⟩—O—(CH₂)₇—CH₃ | 100 | Light-yellow, very fine needles, M.P. 170.5–171° C. (dimethylformamide). | C, 68.97; H, 5.99; N, 8.62. (487.62) | C, 68.79; H, 6.07; N, 8.87. |
| 45 | —C(CH₃)₃ | —⟨phenyl⟩ | 100 | Light-yellow, shiny fine crystals, M.P. 220–220.5° C. (dioxane plus water). | C, 68.81; H, 4.77; N, 10.47. (401.50) | C, 69.06; H, 4.64; N, 10.30. |
| 46 | —C(CH₃)₃ | —⟨phenyl⟩—C(CH₃)₃ | 87 | Pale-yellow, fine crystal powder, M.P. 217.5° C. (dioxane plus water). | C, 70.87; H, 5.95; N, 9.18. (457.60) | C, 70.60; H, 3.95; N, 9.04. |
| 47 | —C(CH₃)₃ | —⟨phenyl⟩—OCH₃ | 95.1 | Light-yellow, shiny flakes, M.P. 192° C. (dioxane). | C, 66.80; H, 4.91; N, 9.74. (431.51) | C, 66.50; H, 4.65; N, 9.68. |
| 48 | —C(CH₃)₃ | —⟨phenyl⟩—O—(CH₂)₇—CH₃ | 100 | Almost colorless, fine crystal powder, M.P. 153° C. (dimethylformamide). | C, 70.29; H, 6.66; N, 7.93. (529.70) | C, 70.36; H, 6.73; N, 8.04. |

EXAMPLE 2

28.6 parts of 5-[5′-phenyl-(1″)-1′:3′:4′-oxadiazolyl-(2′)]-thiophene-2-carboxylic acid methyl ester of the formula (49)

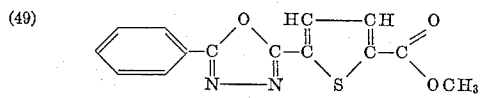

and 10.8 parts of ortho-phenylenediamine are heated with exclusion of air in 250 parts of polyphosphoric acid (containing 83% of phosphorus pentoxide) within one hour to 140° C. while being stirred, and the batch is then stirred on for 15 hours at this temperature. After cooling, the yellow reaction solution is poured into 1500 parts of ice-water, the light-yellow precipitate formed is suctioned off and washed with water. To prepare the free base the filter cake is stirred in 2500 parts of water at 40° C. with aqueous ammonium hydroxide solution until the alkaline reaction persists, the batch is cooled to room temperature, suction-filtered, washed with water and dried. Yield: about 22.8 parts (=66.2% of the theoretical) of 5[benzimidazolyl - (2′)] - 2 - [5′ - phenyl - (1″)-1′:3′:4′-oxadiazolyl-(2′)]-thiophene of the formula (50)

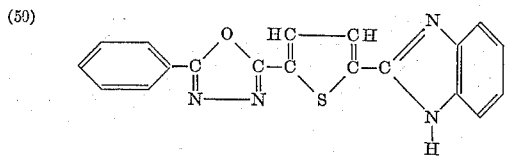

in the form of a pale-yellow powder which, after three recrystallisations form ortho-dichlorobenzene with the aid of bleaching earth, is obtained in the form of light-yellow very fine needles melting at 350 to 350.5° C.

*Analysis.*—$C_{19}H_{12}ON_4S$ (molecular weight 344.40): Calculated—C, 66.26; H, 3.51; N, 16.27%. Found—C, 66.33; H, 3.61; N, 16.33%.

The 5-[5′-phenyl-(1″)-1′:3′:4′-oxadiazolyl-(2′)]-thiophene-2-carboxylic acid methyl ester of the Formula 49 used as starting material can be prepared in the following manner:

37.2 parts of thiophene-2:5-dicarboxylic acid monomethyl ester (prepared as described in Example VIIa of U.S. Patent No. 2,680,731 to E. I. du Pont de Nemours and Company, patented June 8, 1954) in 250 parts by volume of chlorobenzene and 30 parts of thionyl chloride are heated with stirring within one hour to 115° C. and then further stirred for one hour at this temperature; a complete solution is obtained and thiophene-2:5-dicarboxylic acid monomethyl ester chloride is formed. The excess thionyl chloride is removed by passing a current of dry air through the batch or by distillation under reduced pressure, and at 20° C. 27.2 parts of benzoic acid hydrazide and 250 parts by volume of chlorobenzene are then added. While being vigorously stirred, the reaction mixture is heated for 1 to 1½ hours at the boil and then refluxed for 6 to 12 hours, during which the hydrazide of the formula (51)

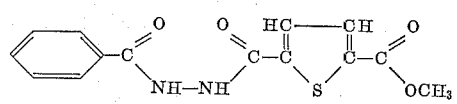

settles out as a colorless substance. When the evolution of hydrochloric acid has ceased, 60 parts of thionyl chloride are dropped in in the course of 30 minutes, and the batch is refluxed for another 4 to 8 hours with exclusion of air. From the resulting clear reaction solution the excess thionyl chloride and the bulk of chlorobenzene are distilled off. During the subsequent cooling to about 10° C. 250 parts by volume of methanol are added. The crystalline precipitate, the 5-[5′-phenyl-(1″)-1′:3′:4′-oxadiazolyl-(2′)]-thiophene-2-carboxylic acid methyl ester of the formula (52)

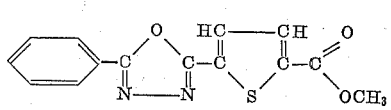

is suctioned off, washed with 250 parts by volume of methanol and dried. Yield: about 53.6 parts (=93.8% of the theoretical) of a pale-yellow, crystalline powder melting at 161.5 to 162° C. After three recrystallisations from dioxane+water (4:1) with the aid of active carbon and bleaching earth, there results a substantially colorless, finely crystalline powder which melts at 164 to 164.5° C.

*Analysis.*—C₁₄H₁₀O₃N₂S (molecular weight 286.31): Calculated—C, 58.73; H, 3.52; N, 9.78%. Found: C, 58.66; H, 3.75; N, 9.83%.

EXAMPLE 3

100 parts of a polyamide fabric, for example spun nylon, are immersed at 60° C. in a bath consisting of:

4000 parts of water
4 parts of dispersant (adduct of 35 mols of ethylene oxide with 1 mol of octadecyl alcohol)
4 parts of 40% acetic acid and
0.5 part of the benzoxazolyl-oxadiazolyl-thiophene compound of the Formula 30, 34 or 38.

The bath is then raised to the boil within 20 minutes and the fabric is treated for 30 minutes at the boil, then rinsed and dried.

The polyamide fabric treated in this manner has a substantially higher white content than the untreated fabric.

When the benzoxazolyl-oxadiazolyl-thiophene compound of the Formula 43 is applied in a similar manner to polyester fabric, a high white content can be obtained which displays good fastness to light.

EXAMPLE 4

A polypropylene fabric is treated at 60 to 100° C. for 90 minutes in a bath consisting of:

4000 parts of water
8 parts of dispersant (adduct of 35 mols of ethylene oxide with 1 mol of octadecyl alcohol) and
0.1 part to 0.3 part of the benzoxazolyl-oxadiazolyl-thiophene compound of the Formula 39 or 44.

After rinsing and drying a white effect is obtained which has outstanding fastness to light.

EXAMPLE 5

An intimate mixture of 100 parts of polyvinyl chloride, 54 parts of dioctyl phthalate, 2 parts of titanium dioxide and 0.1 parts of one of the benzoxazolyl-oxadiazolyl-thiophene compound of the Formulae 30, 36, 39, 43, 44, 47 or 48 is rolled to and fro on a sheeting calender for 6 minutes at 150 to 160° C. to form a foil.

The foils manufactured in this manner have a high white content which displays excellent fastness to light.

What is claimed is:
1. A 2-azolyl-5-oxadiazolyl-thiophene compound of the formula

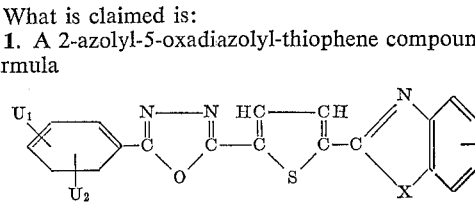

where X is a member selected from the group consisting of —O— and —NH—, $U_1$ is a member selected from the group consisting of hydrogen, halogen, alkyl and alkoxy, $U_2$ is a member selected from the group consisting of hydrogen, lower alkyl and lower alkoxy, and $U_3$ is a member selected from the group consisting of hydrogen and lower alkyl.

2. The compound of the formula

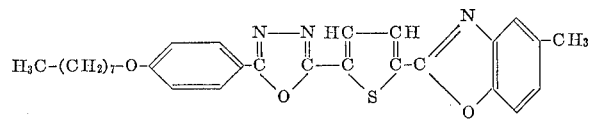

3. The compound of the formula

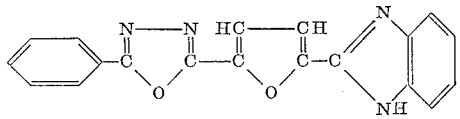

4. The compound of the formula

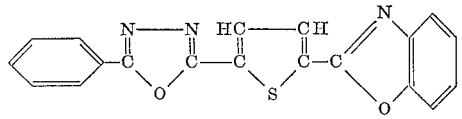

5. The compound of the formula

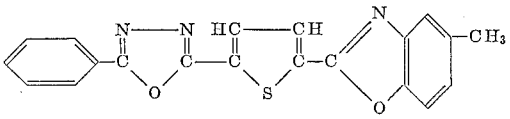

6. The compound of the formula

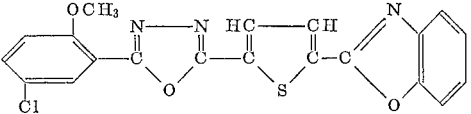

7. The compound of the formula

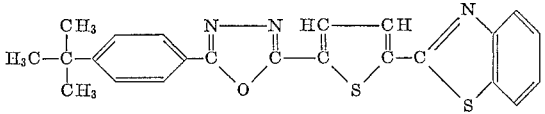

8. The compound of the formula

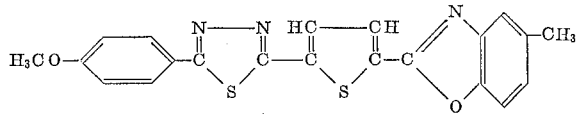

9. The compound of the formula

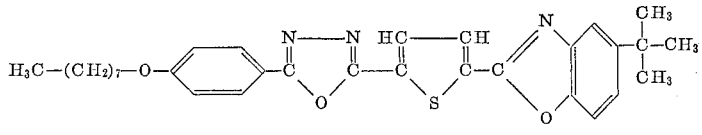

10. The compound of the formula

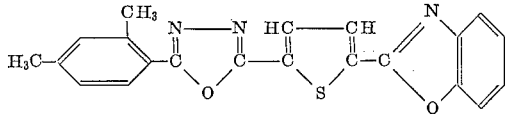

No references cited.

NICHOLAS S. RIZZO, *Primary Examiner.*

HENRY R. JILES, *Examiner.*

ALTON D. ROLLINS, *Assistant Examiner.*

UNITED STATES PATENT OFFICE
CERTIFICATE OF CORRECTION

Patent No. 3,242,188                                        March 22, 1966

Adolf Emil Siegrist et al.

It is hereby certified that error appears in the above numbered patent requiring correction and that the said Letters Patent should read as corrected below.

Column 16, lines 8 to 13, for that portion of the formula reading

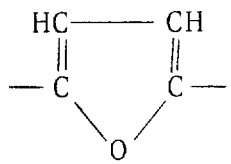      read      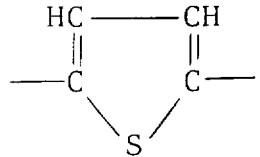

same column 16, lines 41 to 44, for that portion of the formula reading

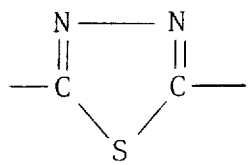      read      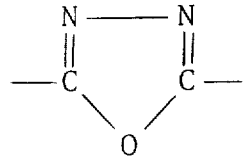

Signed and sealed this 1st day of August 1967.

(SEAL)
Attest:

EDWARD M. FLETCHER, JR.                          EDWARD J. BRENNER
Attesting Officer                                    Commissioner of Patents